United States Patent
Greve

(10) Patent No.: US 11,197,538 B2
(45) Date of Patent: Dec. 14, 2021

(54) PERSONAL CARE DEVICE

(71) Applicant: Braun GmbH, Kronberg (DE)

(72) Inventor: Oliver Greve, Kelkheim (DE)

(73) Assignee: Braun GmbH, Kronberg (DE)

(*) Notice: Subject to any disclaimer, the term of this patent is extended or adjusted under 35 U.S.C. 154(b) by 0 days.

(21) Appl. No.: 16/951,214

(22) Filed: Nov. 18, 2020

(65) Prior Publication Data
US 2021/0145539 A1    May 20, 2021

(30) Foreign Application Priority Data
Nov. 18, 2019  (EP) .................................... 19209796

(51) Int. Cl.
- A46B 15/00 (2006.01)
- A61C 17/22 (2006.01)
- F21V 3/00 (2015.01)
- F21V 31/00 (2006.01)

(52) U.S. Cl.
CPC .. *A46B 15/0044* (2013.01); *A46B 2200/1066* (2013.01); *A61C 17/22* (2013.01); *A61C 17/225* (2013.01); *F21V 3/00* (2013.01); *F21V 31/005* (2013.01)

(58) Field of Classification Search
CPC ................ A61C 1/088; A46B 15/0044; A61H 2201/0188; B26B 21/526
See application file for complete search history.

(56) References Cited

U.S. PATENT DOCUMENTS

| | | |
|---|---|---|
| 3,406,475 A | 10/1968 | Odonnell |
| 4,811,507 A | 3/1989 | Blanchet |
| 4,891,896 A | 1/1990 | Boren |
| 5,345,705 A | 9/1994 | Lawrence |
| 5,604,480 A | 2/1997 | Lamparter |
| 5,806,957 A | 9/1998 | Prior et al. |
| 5,921,012 A | 7/1999 | Caivano |

(Continued)

FOREIGN PATENT DOCUMENTS

| | | |
|---|---|---|
| CN | 206026469 U | 3/2017 |
| DE | 20200808101 A | 10/2018 |

(Continued)

OTHER PUBLICATIONS

Extended European Search Report and Search Opinion; Application No. 19209796.2; dated Apr. 8, 2019.

(Continued)

*Primary Examiner* — Alexander K Garlen
(74) *Attorney, Agent, or Firm* — Vladimir Vitenberg

(57) ABSTRACT

A personal care device has a hollow housing having at least a first transparent or translucent portion extending between the housing's outer and inner surfaces, a carrier fixed inside the housing, at least a first light source mounted on the carrier, and a light barrier mounted on the carrier. The light barrier has at least a first spring arranged to bias a light barrier plate of the light barrier against the housing's inner surface. The light barrier plate has at least a first light transmission portion that is aligned with the first light source and the first transparent or translucent portion of the housing, so that light emitted by the first light source is visible at the outer surface of the first transparent or translucent portion.

14 Claims, 7 Drawing Sheets

(56) References Cited

U.S. PATENT DOCUMENTS

| | | | |
|---|---|---|---|
| 6,278,069 B1* | 8/2001 | Lee | H01H 13/807 |
| | | | 200/16 C |
| 7,721,475 B2 | 5/2010 | Chiang et al. | |
| 8,967,819 B2* | 3/2015 | Jaeger | A61C 19/004 |
| | | | 362/23.05 |
| 9,865,184 B2 | 1/2018 | Jungnickel et al. | |
| 2003/0221267 A1* | 12/2003 | Chan | A61C 17/225 |
| | | | 15/22.1 |
| 2006/0254702 A1 | 11/2006 | Emslander et al. | |
| 2007/0186453 A1 | 8/2007 | Little et al. | |
| 2008/0141476 A1 | 6/2008 | Gatzemeyer et al. | |
| 2008/0218371 A1 | 9/2008 | Joo | |
| 2010/0024143 A1* | 2/2010 | Dickie | A46B 15/0087 |
| | | | 15/167.1 |
| 2011/0314677 A1* | 12/2011 | Meier | A46B 13/02 |
| | | | 30/41.8 |
| 2014/0259474 A1* | 9/2014 | Sokol | A61C 17/227 |
| | | | 15/22.2 |
| 2016/0151133 A1* | 6/2016 | Luettgen | A61C 17/0202 |
| | | | 433/80 |
| 2017/0360538 A1* | 12/2017 | Luo | A61C 17/221 |
| 2018/0168332 A1* | 6/2018 | Wagner | F21V 7/10 |

FOREIGN PATENT DOCUMENTS

| | | |
|---|---|---|
| EP | 0791911 A2 | 8/1997 |
| EP | 1058227 A1 | 12/2000 |
| GB | 840424 A | 7/1960 |
| GB | 2278239 A | 11/1994 |
| WO | 2017129587 A1 | 8/2017 |

OTHER PUBLICATIONS

PCT Search Report and Written Opinion for PCT/IB2020/060787 dated Feb. 17, 2013.

* cited by examiner

PERSONAL CARE DEVICE

FIELD OF THE INVENTION

The present disclosure is concerned with a personal care device that is arranged for indicating an visually detectable light sign on the outer side of a housing of the personal care device via a transparent or translucent portion of the housing, where a light source is disposed in the housing and a light barrier is provided to guide the light from the light source to the transparent or translucent portion of the housing.

BACKGROUND OF THE INVENTION

It is known that a personal care device such as an electric toothbrush often has several modes of operation, which modes can be selected by a user via a mode selection button or the like. Often, a visual indication of the selected mode is shown on the outer surface of the electric toothbrush, e.g. selectively illuminable icons may be provided in a housing of the electric toothbrush, so that by means of a light source that can be switched on and off the icon is illuminated. It is also known that a light shield or light barrier can be provided between two light sources so that the light emitted from one light source is not also illuminating a neighboring icon.

Document WO 2017/129587 A1 discloses an oral cleaning device comprising a handle portion with a plurality of indicia and a plurality of illuminating elements, and a user interface assembly, the user interface assembly including an interface panel and a baffle assembly, the baffle assembly including a plurality of baffle sections each corresponding with a respective one of the plurality of illuminating elements and a respective one of the plurality of indicia, and further where each of the plurality of baffle sections including a cover portion covering the baffle section and positioned between the respective one of the plurality of illuminating elements and the respective one of the plurality of indicia. The user interface assembly is structured to be blank when the device is powered off, and to illuminate one of the indicia when the device is powered on.

There is a general object to provide a personal care device of the mentioned type that has a simple design and that effectively reduces light crosstalk between neighboring indicators.

SUMMARY OF THE INVENTION

In accordance with one aspect, a personal care device is provided comprising a hollow housing having at least a first transparent or translucent portion extending between an outer surface of the housing and an inner surface of the hollow housing, a carrier mounted inside the hollow housing in a fixed position relative to the hollow housing, at least a first light source mounted on the carrier, a light barrier element mounted on the carrier, wherein the light barrier element has at least a first spring element arranged to bias a light barrier plate of the light barrier element against the inner surface of the hollow housing, the light barrier plate having at least a first light transmission portion that is in positional alignment with the first light source and in positional alignment with the first transparent or translucent portion of the hollow housing so that light emitted by the first light source is visible at the outer surface of the first transparent or translucent portion.

BRIEF DESCRIPTION OF THE DRAWINGS

The present disclosure will be further elucidated by a detailed description of example embodiments of a personal care device. In the description, reference is made to figures, where in the figures

DETAILED DESCRIPTION OF THE INVENTION

Figure 1:
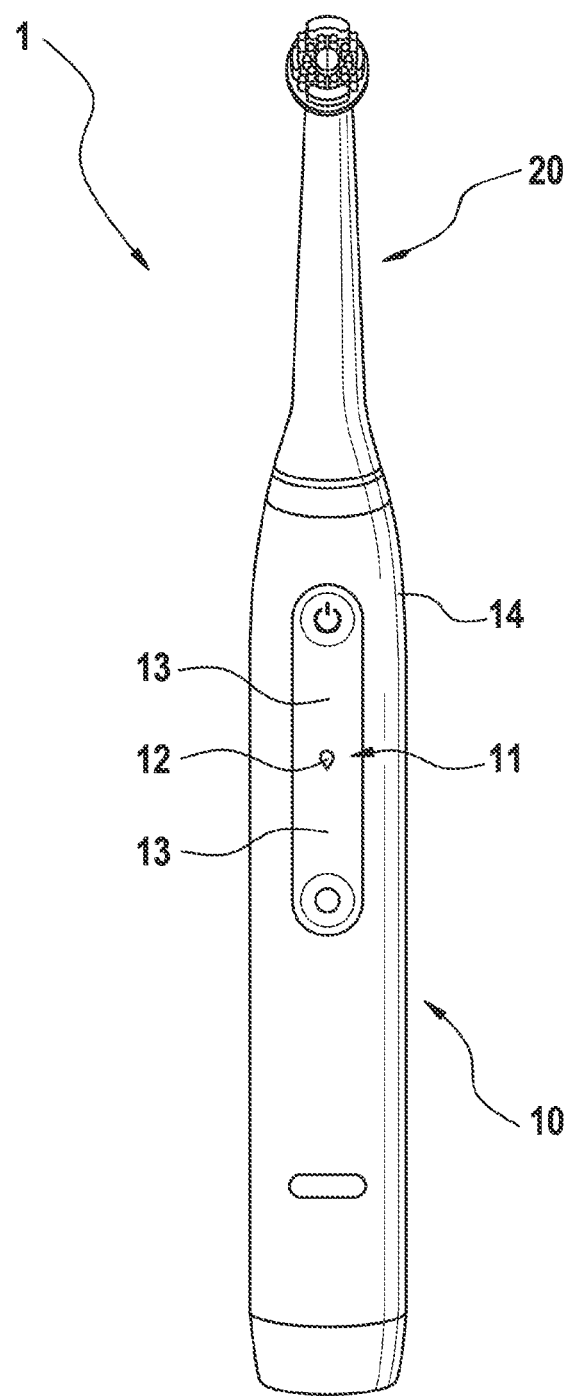
FIG. 1 is a depiction of an example embodiment of a personal care device in accordance with the present description.

In the context of the present description "personal care" shall mean the nurture (or care) of the skin and of its adnexa (i.e. hairs and nails) and of the teeth and the oral cavity (including the tongue, the gums etc.), where the aim is on the one hand the prevention of illnesses and the maintenance and strengthening of health ("care") and on the other hand the cosmetic treatment and improvement of the appearance of the skin and its adnexa or of the teeth and the oral cavity. It shall include the maintenance and strengthening of well-being. This includes skin care, hair care, and oral care as well as nail care. This further includes grooming activities such as beard care, shaving, and depilation. A "personal care device" thus means any device for performing such nurturing or grooming activity, e.g. (cosmetic) skin treatment devices such as skin massage devices or skin brushes; wet razors (with or without electronic or electric components such as a vibration device); electric shavers or trimmers; electric epilators; and oral care devices such as manual or electric toothbrushes, (electric) flossers, (electric) irrigators, (electric) tongue cleaners, or (electric) gum massagers. This shall not exclude that the proposed personal care device may have a more pronounced benefit in one or several of these nurturing or device areas than in one or several other of these areas.

Where the terms "opaque", "translucent" or "transparent" or the respective nouns "opacity", "translucency" or "transparency" are used in the present disclosure, these terms are to be understood as relating to the light that is emitted by the respective relevant light source. Hence, usage of these terms shall not exclude that the object being, e.g., translucent for the light of the relevant light source (e.g. the first light source) is opaque for light of another light source. These qualitative terms are generally understood by a person skilled in the art and are sufficient for comparisons, e.g. a first material having a higher translucency than a second material.

In the following, terms like "first light source" or "first light transmission portion" are used to indicate that the described personal care device benefits from the proposed structure even if only one such element is present. Often it is explained that also a "plurality of light sources" or a "plurality of light transmission portions" can be present. That shall mean that the plurality of objects comprises the "first" object. Where only "first" is used, it shall be understood that this implies "first or plurality" if not clear from the context that a plurality is excluded.

In accordance with the present description, a personal care device is proposed that comprises at least a first light source disposed within a hollow housing of the personal care device, which first light source can be selectively switched on and out. The personal care device is arranged so that a user can see a symbol, icon or at least a light spot on the outer surface of the hollow housing when the first light source is switched on. In order to allow this, the personal care device comprises a first light guiding structure to guide the light of the first light source to the outer surface of the hollow housing. In order to achieve this first light guiding structure, the hollow housing comprises a first transparent or translucent portion that extends between an outer surface of the housing and an inner surface of the housing. The first transparent or translucent portion may at least over some ration of the thickness of the housing be surrounded by an opaque material. The first light source is mounted on a carrier, which carrier is fixedly mounted with respect to the hollow housing. A light barrier element is also mounted on the carrier, which light barrier element has at least a first light transmission portion that is part of the first light guiding structure. The light barrier element may be mounted at the carrier by means of at least a first holding element which may be realized as a snap hook. The first light source, the first light transmission portion, and the first transparent or translucent portion are in positional alignment so that light emitted from the first light source can be seen by a user via the first transparent or translucent portion in the handle. The light barrier element is made from a material opaque for the light emitted by the first light source at least in an area around the first light transmission portion and the hollow housing may be made from a material opaque for the light emitted by the first light source at least in an area around the first transparent or translucent portion. The first light transmission portion of the light barrier element may be realized as a through hole or may be made from a transparent or translucent material.

In accordance with the present disclosure, the light barrier element has a light barrier plate comprising the first light transmission portion or the plurality of light transmission portions and at least a first or a plurality of spring elements that are supported at the carrier so that the light barrier plate can be moved against the spring force of the first spring element or the plurality of spring elements towards the carrier. The first spring element may comprise a projection that abuts the carrier so that the first spring element can deform relative to this support under the application of an external force. In particular, the light barrier element may be mounted in such a manner at the carrier that the projection pushes the first spring element into a pre-stressed position so that the light barrier element is effectively play-free mounted at the carrier. The light barrier element is designed such that the light barrier plate has a rest position when mounted on the carrier in which a top surface of the light barrier plate is above the level of an inner surface of the hollow housing. This means that in the assembly process the light barrier plate is pushed down towards the carrier by mechanical interaction with the hollow housing and that in turn means that the spring force of the spring element(s) pushes the top surface of the light barrier plate against the inner surface of the hollow housing and hence both tightly abut on each other without a gap if the upper surface of the light barrier plate follows the shape of the inner surface of the hollow housing at least in the area around the first light transmission portion. In case a rigid, i.e. not spring-mounted light barrier element would be used, the top surface of the light barrier element needed to be designed to be securely lower than the inner surface of the hollow housing and a gap would always be present between both. Light could then travel through the gap between neighboring light guiding structures and switching on one light source could then at least partly or at least perceivably illuminate a neighboring symbol or icon or spot. Such light crosstalk may convey a low product quality to a user.

In some embodiments, the first transparent or translucent portion of the housing has two layers that have different optical properties. The layers may individually not need to have a constant thickness but may together form a portion of the hollow housing having a constant thickness (even though a constant thickness of the hollow housing is not a requirement). The inner or first layer may be translucent and the outer or second layer may be transparent or may have at least a lower level of light transmissivity. In an example embodiment, the outer layer of the first transparent or translucent portion has optical properties so that in a state when the first light source is not switched on, a user essentially cannot see into the hollow housing. E.g. this outer layer may be blackened or otherwise dyed so that a certain fraction of the light is absorbed by the outer layer. Without being limited by the specific examples, the outer layer may ins some embodiments be essentially transparent. It should here be understood that any material absorbs light and scatters light, for which properties wavelength-dependent coefficients can be determined. A material described as transparent thus has a low absorption coefficient and a low scattering coefficient. A material with a low scattering coefficient and a high absorption coefficient makes it essentially impossible to see through the material, but a strong light source may still be sharply seen through this material. Such a "dark" transparent material may be chosen for aesthetic reasons. Likewise, a "dark" translucent material may be chosen. The "dark" quality may be achieved by adding a light absorbing material (e.g. a pigment) into the transparent or translucent base material. A skilled person can determine the amount of such additive in dependence of the design of the hollow housing. Further, the inner or first layer may be made from a translucent material and a material that is opaque for the light emitted by the first light source may surround the first layer in a manner so that a particular geometry of the first layer is formed, e.g. resembling the shape of a particular symbol or icon or a specific word. These symbols and/or words may be used to indicate different operation modes of the personal hygiene device or may be used to indicate other functions of the personal care device. In another embodiment, the first transparent or translucent portion of the hollow housing is completely made from a translucent material or completely made from a transparent material.

In some embodiments, a plurality of light sources including the first light source is mounted on the carrier, the light barrier element has a plurality of light transmission portions including the first light transmission portion and the housing has a plurality of transparent or translucent portions including the first transparent or translucent portion. The respective pluralities may each have an equal number of elements.

Then a plurality of different or from each other distinguishable light signals can be switched on to communicate certain information to the user of the device.

As proposed in the present disclosure, the light barrier element comprises at least a first spring element that biases the light barrier plate against the inner surface of the housing. Such a biased setup serves to ensure that light emitted from a light source has essentially no possibility to travel to a neighboring transparent or translucent portion of the hollow housing. Without such a biasing design as proposed, the unavoidable tolerances of the various elements of the personal care device would inevitably lead to a gap between a non-biased light barrier plate and the inner surface of the housing. Light emitted from the first light source could then travel via the gap to neighboring transparent or translucent portions of the housing as was already discussed.

In some embodiments, the light barrier element comprises at least a first holding element or at least two holding elements comprising the first holding element. The first holding element or the plurality of holding elements may be realized as snap hooks. The light barrier element may also comprise two spring elements comprising the first spring element, which spring elements are arranged on opposing side of the light barrier plate. At least the first spring element may comprise a projection that abut the carrier so that the light barrier element is pre-stressed against the carrier. In this context, a carrier contact surface of a first holding element and a carrier contact surface of the projection of the first spring element may define a distance between them in an unmounted state that is smaller than the thickness of the carrier so that in the mounted state the first spring element is in a pre-stressed state, which reduces play between the light barrier element and the carrier so that rattling sound is avoided when the personal care device vibrates in operation. In some embodiments, at least the light barrier plate of the light barrier element is made from a polyoxymethylene (POM) material. In some embodiments, the light barrier element has a rotational symmetry of order two with respect to a central axis that is perpendicular to the main extension plane of the light barrier plate for reducing assembling complexity. In some embodiments, the light barrier plate comprises a soft sealing lip that is arranged at a lower surface of the light barrier plate facing the carrier and which sealing lip may in particular encircle the light transmission portion. The sealing lip may range in the extra soft to soft hardness range, e.g. may have a hardness in the range of between about 10 Shore 00 and 80 Shore 00 (i.e. about 50 Shore A), hence the material may range from hydrogels to natural rubber.

FIG. 1 is a depiction of an example personal care device 1 realized as an electric toothbrush having a handle 10 comprising a hollow housing 14 and a replaceable functional head 20 for applying a personal care treatment, the replaceable functional head 20 being here realized as a brush head. A display section 11 is provided on the front side of the hollow housing 14. A first illuminated symbol 12 is seen on the outer side of the housing 14 within the display section 11. As will be explained in more detail in the following, the first illuminated symbol 12 becomes visible as a first light source that is disposed on a carrier in the hollow housing 14 is switched on and the light emitted by the light source is guided by a first light transmission portion in a light barrier plate and by a first transparent or translucent portion in the hollow housing 14. In particular, the first transparent or translucent portion may have a shape that generates the visible shape of the first visible symbol 12. It is indicated in FIG. 1 that one or several further illuminable symbols 13 may become visible on the outer side of the hollow housing 14 if respective light sources are switched on. As will be explained, the mentioned light barrier plate serves to essentially avoid that light emitted from the first light source illuminates the one or several further symbols 13 by using at least a first spring element biasing the light barrier plate against an inner surface of the hollow housing 14 so that any gap due to tolerances of the parts is avoided. In an embodiment with only a single illuminable symbol, the gap-free arrangement serves to hinder light to penetrate to other regions of the hollow handle where the light may become visible.

Figure 2:
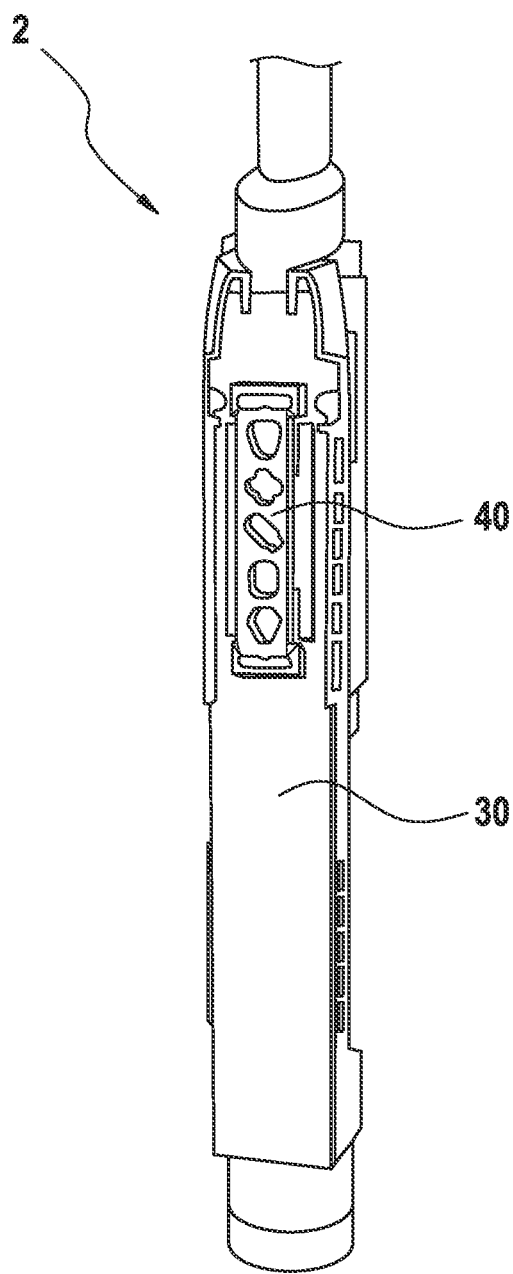
FIG. 2 is a depiction of pre-assembled parts of a personal care device.

FIG. 2 is a depiction of example pre-assembled inner parts 2 of a personal care device, i.e. a hollow housing is not shown. The pre-assembled inner parts 2 are also shown without a functional head. The pre-assembled inner parts 2 comprise a carrier 30 and a light barrier element 40 that is mounted on the carrier 30. The pre-assembled inner parts 2 as shown may be slid into a hollow housing and the carrier 30 may then become fixedly mounted at the hollow housing by means of clamping and/or snapping-in elements. A bottom closure may be used to close the open bottom of the hollow housing through which the pre-assembled inner parts 2 were slid.

Figure 3:
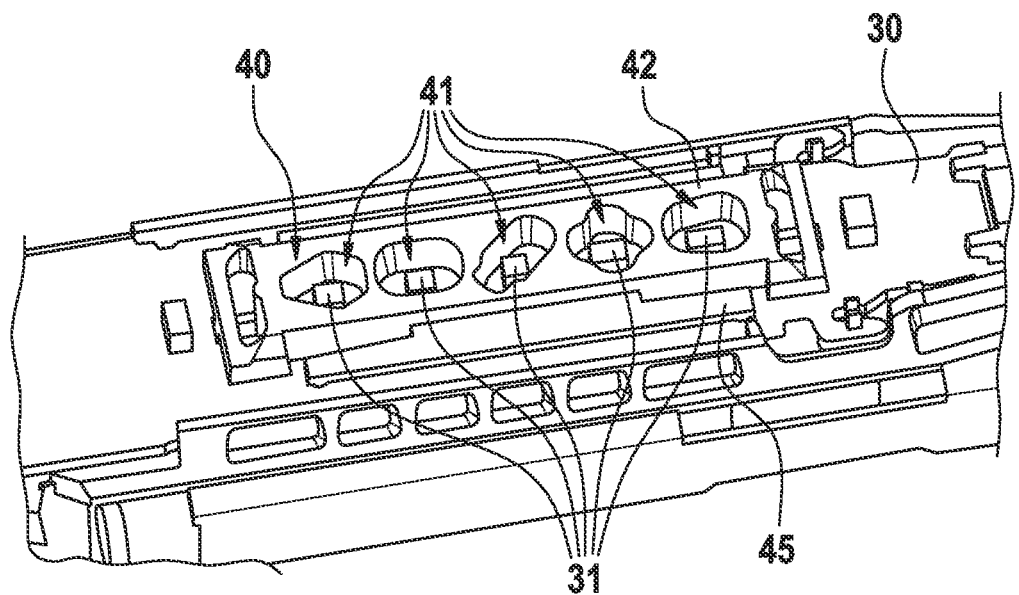
FIG. 3 is a magnification of a light barrier element comprising portion of the pre-assembled parts of FIG. 2.

FIG. 3 shows a magnification of an example embodiment of pre-assembled inner parts of a personal care device. The pre-assembled inner parts comprise a light barrier element 40 mounted on a carrier 30. The light barrier element 40 comprises here five light transmission portions 41 that are realized as through holes through a light barrier plate 42. The light barrier element 40 also comprises a first spring element 45 and a second spring element that is disposed opposite to the first spring element 45 on the other side of the light barrier element 40. As was already said and will be explained in more detail, the light barrier element 40 is mounted at the carrier 30 so that the light barrier plate 42 can be moved towards the carrier 30 against the spring force of the first and second spring elements 45. The light barrier element 40 is designed such that when the pre-assembled parts are mounted in the hollow housing of the personal care device, the light barrier plate 42 will always be moved towards the carrier by mechanical interaction with the inner surface of the hollow housing, i.e. the light barrier plate will always have an interference with respect to the hollow housing independent from the tolerances of the parts. By such a design, it is assured that the light barrier plate 42 will always be biased by the first and second spring elements 45 against the inner surface of the hollow housing.

A plurality of light transmission portions 41 realized as through holes are provided in the light barrier plate 42. Further, five light sources 31 are mounted on the carrier. The light sources 31 may be realized as surface mount LEDs (SMD LEDs). It can be seen that each light transmission portion 41 is aligned in position with one of the light sources 31. The light barrier plate 42 is made from a material that is opaque for the light emitted by the light sources 31. In the shown example, the light transmission portions 41 are roughly shaped to envelope the transparent or translucent portions of the hollow housing. Instead as being realized as through holes, the light transmission portions 41 may also be realized as transparent or translucent portions, e.g. the light barrier element may then be realized as a two-component plastic injection molded part.

Figure 4:
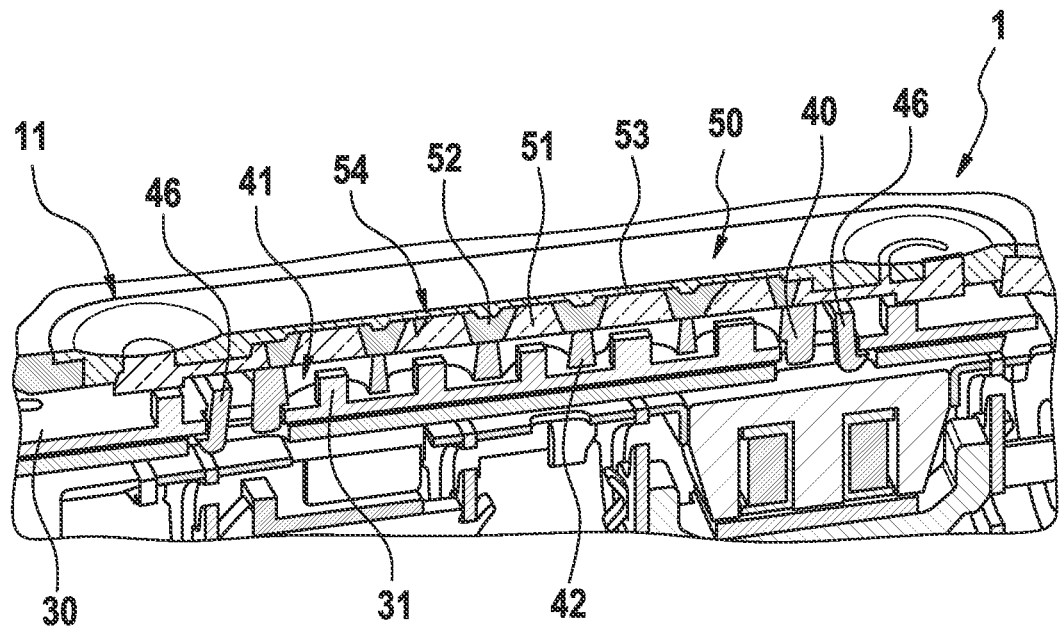
FIG. 4 is a cross-sectional cut through an example personal care device.

FIG. 4 is a cross-sectional cut through a personal care device 1 that comprises a hollow housing 11 and inner parts as already discussed. The hollow housing 11 comprises a display section 50 in which five transparent or translucent portions 51 are realized. The structure of the hollow housing 11 and of the translucent and transparent portions 51 will be explained in more detail with reference to FIGS. 5A to 5C, but is shall be understood that this is just one non-limiting example of a hollow housing 11 comprising at least a first transparent or translucent portion 51.

A light barrier element 40 is mounted on a carrier 30 as was discussed before. Here, the light barrier element 40 comprises two holding elements 46 realized as undercut snap-hooks. As will be explained in a following paragraph with reference to FIG. 6, the light barrier element 40 is held by the holding elements 46 in such a manner so that spring elements of the light barrier element 40 are pre-stressed against the carrier 30 and thus the light barrier element 40 is held in a play-free manner at the carrier 30 and cannot cause any rattling noise. A light barrier plate 42 is biased against an inner surface of the hollow housing 11 by the spring elements as previously discussed so that a top surface of the light barrier plate is essentially in gap-free contact with an inner surface of the hollow housing 11. As was discussed with reference to FIG. 3, five light transmission portions 41 are provided in the light barrier plate 42, where each light transmission portion 41 is positionally aligned with one light source 31 mounted on the carrier 30. Each of the light transmission portions 41 is in turn also positionally aligned with a transparent or translucent portion 54 of the display section 50. The transparent or translucent portions 54 are here realized by two layers of transparent of translucent material as will be explained in the following. Five transparent or translucent elements 51 are separated from each other by surrounding walls of opaque material 52 so that light can essentially not travel to neighboring areas. The transparent or translucent elements 51 extend from the inner surface of the hollow housing 11. A transparent or translucent layer 53 forms a top layer that defines the display section 50 on the outer surface of the hollow housing 11. The transparent layer 53 may absorb light so that ambient light can essentially not reveal the structure of the transparent of translucent elements 51 embedded in the opaque material 52 to a user of the personal care device 1, but the absorption may be defined to be low enough so that the illuminated symbols defined by the transparent or translucent elements 51 can be easily seen by a user on the outer surface of the hollow housing 11. In the present example, each one of the transparent or translucent elements 51 and the respective associated portion of the transparent or translucent layer 53 forms a transparent or translucent portion 54 in the hollow housing 11 in accordance with the present disclosure. The transparent or translucent portions 54 extend from the inner surface to the outer surface of the hollow housing 11.

Figure 5A:
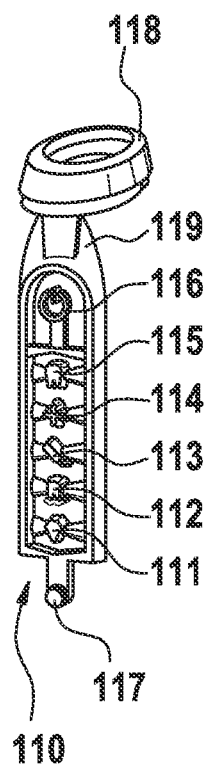
FIG. 5A shows a first manufacturing stage of making a hollow housing for a personal care device.
Figure 5B:
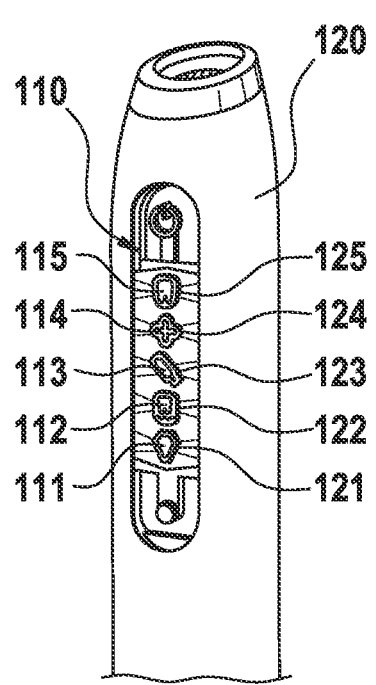
FIG. 5B shows a second manufacturing stage of making a hollow housing for a personal care device.
Figure 5C:
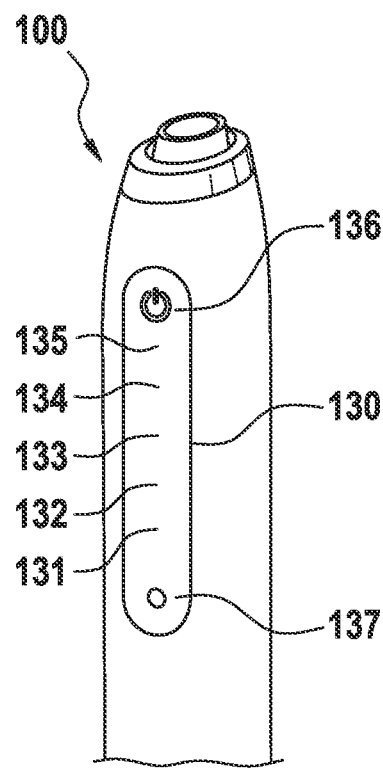
FIG. 5C shows a third manufacturing stage of making a hollow housing for a personal care device.

FIGS. 5A to 5C show different consecutive stages in the manufacturing of an example hollow housing 100 of a personal care device (the hollow housing 100 as shown may be used for a personal care device 1 as shown in FIG. 1 or in FIG. 4).

FIG. 5A shows a first manufacturing stage of the housing 100 in which a first housing element 110 is provided that may be made by plastic injection molding using a translucent material, e.g. a translucent Schulablend®, available from LyondellBasell Industries N.V., Rotterdam, The Netherlands. The first housing element 110 comprises a frame structure 119 that connects various functional elements, in particular it defines five symbol-like or icon-like portions 111 to 115 that will become part of five transparent or translucent portions. Further translucent portions 116 and 117 are provided that will form symbols on two flexible portions of the final housing 100 (the flexible portions 136 and 137 are shown in FIG. 5C), which flexible portions will allow a user to push buttons that may be disposed underneath the flexible portions in the final personal care device. In the shown example, also a light ring 118 is formed as part of the first housing element 110, which light ring 118 may be used to communicate visually perceivable signals to the user such as end of a predetermined time period or application of a too high pressure when using the personal care device.

FIG. 5B shows a second manufacturing stage of the housing 100 in which a second housing element 120 was added, which second housing element 120 may be made by plastic injection molding, in particular via a molding step in which the first housing part 110 was used as insert in the mold and the second housing part 120 is then injection molded over the insert. The second housing element 120 is made from an opaque material that bonds with the translucent material of the first housing element 110. The five symbols or icons 111 to 115 are now surrounded by the opaque material of the second housing element 120 so that five opaque surrounding walls 121 to 125 are formed that define the size and shape of the structures/icons 111 to 115. In case a light source is disposed on the other side of the shown intermediate housing underneath one of the symbols 111 to 115 and if this light source is then switched on, a diffuse light will emanate from the respective symbol or icon 111 to 115 and the user cannot see the light source underneath the translucent symbol 111 to 1115.

FIG. 5C shows a third stage in the manufacturing of the hollow housing 100. A third housing element 130 was added, which third housing element 130 may have been made by plastic injection molding, in particular in a mold into which the intermediate housing shown in FIG. 5B was inserted and then overmolded. The material used for making the third housing element 130 may be transparent or translucent but may have a relatively high absorption rate so that ambient light does essentially not render the symbols 111 to 115 visible for the user's eye. Thus, the first to fifth transparent or translucent portions 131 to 135 that are formed in the hollow housing 100 are not recognizable under ambient light conditions but will only become visible once a light source is switched on behind the respective transparent or translucent portion 131 to 135. As was already discussed with respect to FIG. 1, the symbol behind which a light source is switched one becomes visible.

The translucent material used for making the first housing element 110 thus forms a first or inner layer of the five transparent or translucent portions 131 to 135 of the hollow housing 100 and the transparent material used for making the third housing element 130 forms a second or outer layer of the five transparent or translucent portions 131 to 135.

The material of the third housing component 130 may be a thermoplastic elastomer so that two flexible portions 136 and 137 are formed that allow a user to deform these flexible portions 136 and 137 with a finger, e.g. a thumb, and to trigger a switch element that may be disposed underneath each of the flexible portions 136 and 137. As is shown in FIG. 5C, the portions of the first housing element 110 that indicate the respective button reach up to the outer surface so that the respective symbol is visible on the outer surface of the hollow housing 100 and a user can easily identify the location of these flexible portions 136 and 137.

Figure 6:
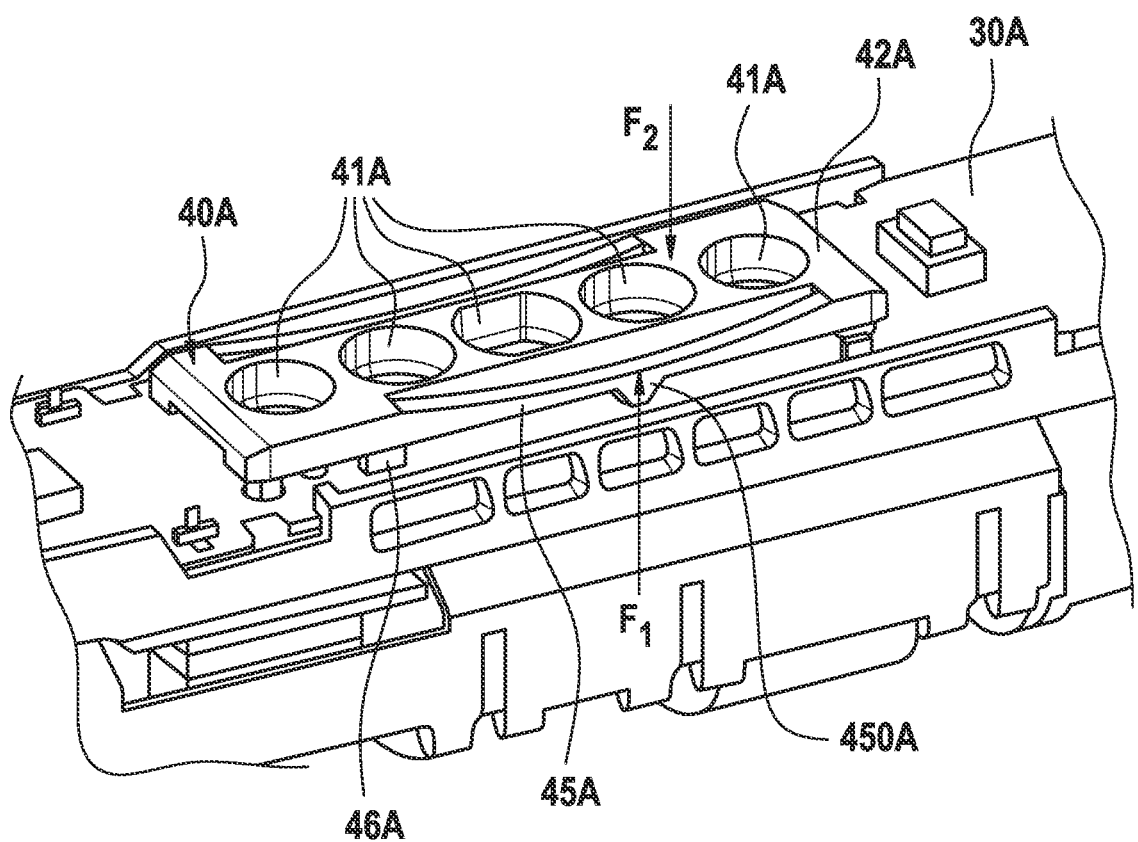
FIG. 6 is a depiction similar to FIG. 3 but of another example embodiment.

FIG. 6 is a magnification of pre-assembled parts of a personal care device that is similar to what was shown and discussed with reference to FIG. 3, but here showing another example embodiment of a light barrier element 40A mounted on a carrier 30A. The light barrier element 40A comprises a light barrier plate 42A, a first and a second spring element 45A, and two holding elements 46A that may be realized as snap-hooks as previously discussed. The spring elements 45A here comprise a projection 450A that is designed so that the carrier 30A and the projection 450A push against each other when the light barrier element 40A is mounted at the carrier 30A and the spring elements 45A are pre-stressed against the carrier 30A to reduce play between the light barrier element 40A and the carrier 30A. Five light transmission portions 41A are provided in the light barrier plate 42A, which light transmission portions are again realized as trough holes in the light barrier plate 42A. The light barrier plate 42 is made from an opaque material.

Figure 7A:
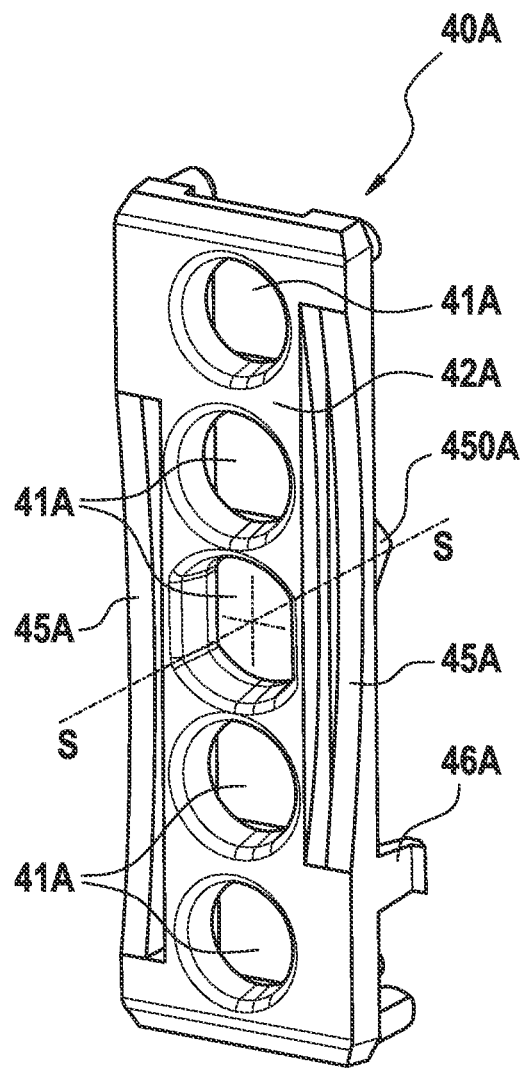
FIG. 7A is a perspective top view of an example light barrier element shown in isolation.
Figure 7B:
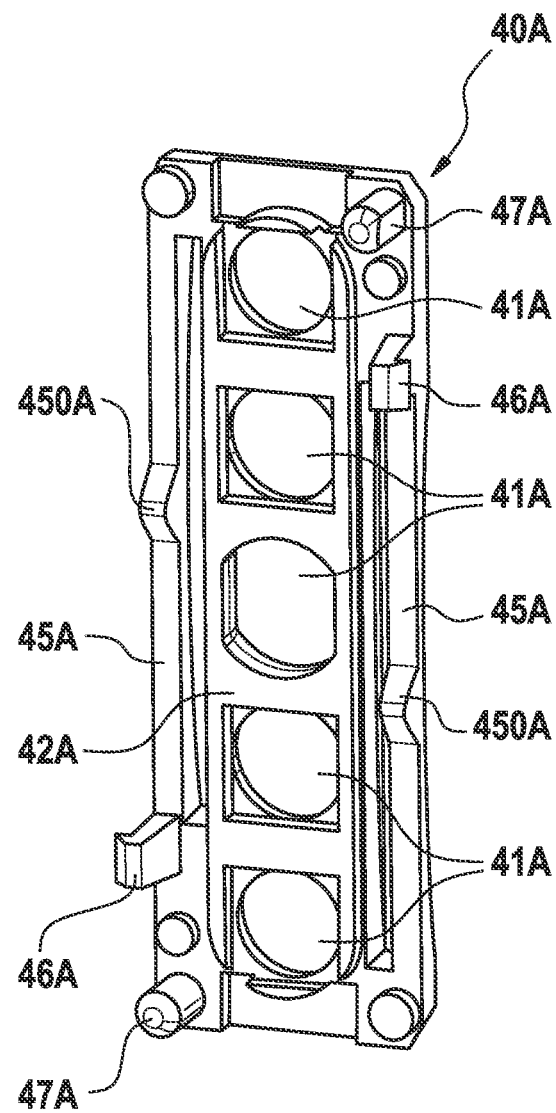
FIG. 7C is a side view of the light barrier element of FIG. 7A.
Figure 7C:
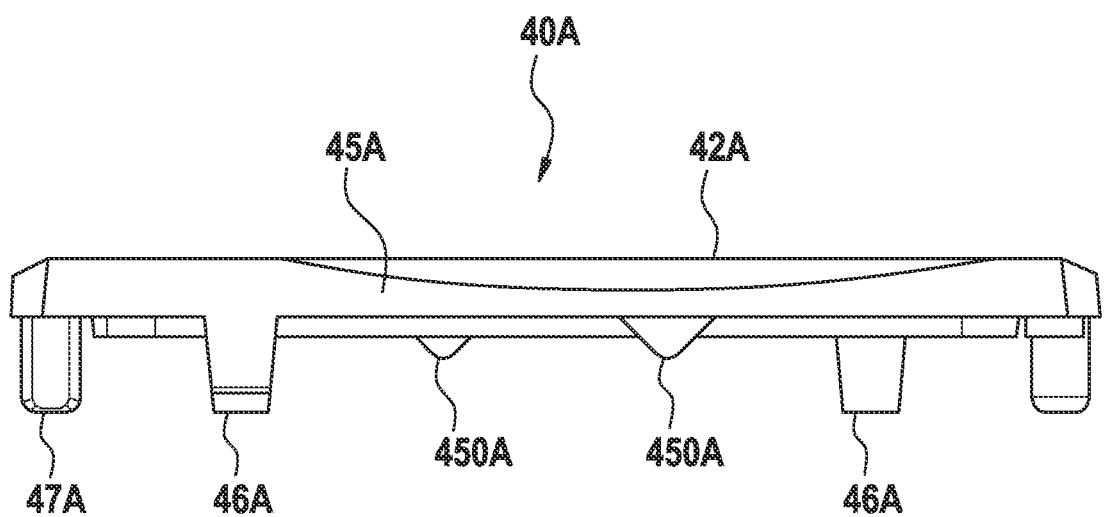

FIGS. 7A, 7B and 7C are a perspective top view, a perspective bottom view and a side view of the light barrier element 40A of FIG. 6 shown in isolation. The light barrier element 40A comprises a light barrier plate 42A in which five light transmission portions 41A are provided as through holes, two spring elements 45A, two holding elements 46A, and two alignment elements 47A. The light barrier element 40A has a 180 degrees rotational symmetry with respect to center axis S (in other words, a rotational symmetry of order 2). This tends to reduce complexity during manufacturing as it is irrelevant whether the light barrier element is provided with the right orientation when it is grasped in an automated assembly process. The alignment elements 47A will be received by respective alignment holes in the carrier to assure correct alignment of the light barrier 40A element on the carrier. The holding elements 46A are realized as snap hooks that will deform when the light barrier element 40A is mounted on the carrier and the undercut noses will then snap underneath the carrier into the rest position so that the light barrier element 40A cannot be removed from the carrier once it is mounted. The spring elements 45A each comprise a projection 450A. The distance between the contact surfaces of the noses of the snap hooks and the lowest point of the projections 450A is less than the thickness of the carrier so that in the mounted state the carrier will bias the spring elements 45A into a pre-stressed position so that the spring elements 45A and the holding elements 46A clamp the light barrier element 40A at the carrier in a gap-free manner. While this is not shown, the light barrier plate 42A may comprise a soft sealing lip made from a soft and opaque material, which sealing lip may be provided at the lower surface of the light barrier plate 42A and may in particular encircle each of the light transmission portions 41A. As the light barrier plate 42A is designed so that it does not contact the carrier in the mounted state, when the hollow housing pushes down the light barrier plate, a gap between the light barrier plate 42A around the light transmission portions 41A will remain. A soft, i.e. deformable and opaque sealing lip would close this gap without diminishing the functionality of the spring mounted light barrier plate 42A. A soft silicone material may be used for said sealing lip.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

What is claimed is:

1. A personal care device comprising:
   a hollow housing having at least a first transparent or translucent portion extending between an outer surface of the housing and an inner surface of the housing;
   a carrier mounted inside the housing in a fixed position relative to the housing;
   at least a first light source mounted on the carrier;
   a light barrier element mounted on the carrier, wherein the light barrier element has at least a first spring element arranged to bias a light barrier plate of the light barrier element against the inner surface of the housing;
   the light barrier plate having at least a first light transmission portion that is in positional alignment with the first light source and in positional alignment with the first transparent or translucent portion of the housing so that light emitted by the first light source is visible at the outer surface of the first transparent or translucent portion, wherein the light barrier plate is pre-stressed against the carrier, wherein the first spring element comprises a projection that abuts the carrier.

2. The personal care device of claim 1, wherein the first light transmission portion is a through-hole in the light barrier plate and the light barrier plate is made from a material that is essentially opaque for the light emitted by the first light source at least in an area around the first light transmission portion.

3. The personal care device of claim 1, wherein the first light transmission portion is made from a material that is transparent or translucent for the light emitted by the first light source and the light barrier plate is made from a material that is opaque for the light emitted by the first light source at least in an area around the first light transmission portion.

4. The personal care device of claim 1, wherein a plurality of light sources including the first light source are mounted on the carrier and the light barrier plate has a plurality of light transmission portions including the first light transmission portion that are arranged in positional alignment with the light sources, wherein a number of light sources is identical to a number of light transmission portions.

5. The personal care device in accordance of claim 1, wherein the light barrier element comprises at least a first holding element for holding the light barrier element at the carrier, wherein the first holding element is realized as a snap hook.

6. The personal care device in accordance with of claim 1, wherein the first transparent or translucent portion is made at least partly from a material that is translucent for the light emitted by the first light source.

7. The personal care device of claim 1, wherein the first transparent or translucent portion has a first layer extending from the inner surface of the housing towards the outer surface of the housing, wherein the first layer is made from a material that is translucent for the light emitted by the first light source, and a second layer that extends from the outer surface towards the inner surface and that abuts the first layer, wherein the second layer is made from a material that is transparent or translucent for the light emitted by the first light source, wherein the material of the second layer comprises an absorbing additive causing ambient light essentially to preclude visibility of structures located below the second layer.

8. The personal care device of claim 7, wherein the first layer of the first transparent or translucent portion is surrounded by a material that is opaque for the light emitted by the first light source at least on the level where the first layer abuts the second layer.

9. The personal care device of claim 1, wherein the light barrier plate comprises a sealing lip made from a material that is essentially opaque for at least the light emitted from the first light source, which sealing lip extends at least partially between the light barrier plate and the carrier, and wherein the sealing lip is elastically deformable.

10. The personal care device of claim 1, wherein the sealing lip is made from a thermoplastic elastomer having a Shore OO hardness in the range of between 10 and 80.

11. The personal care device of claim 1, wherein at least the light barrier plate is made from a polyoxymethylene material.

12. The personal care device of claim 1, wherein the light barrier element has a rotational symmetry of order 2 with respect to a center axis of the light barrier element.

13. The personal care device of claim 1, wherein the first spring element has a spring constant of between 3 N/mm to 50 N/mm in a direction normal to the carrier.

14. The personal care device of claim 1, wherein the at least a first spring element comprises two spring elements arranged on two opposing sides of the light barrier plate.

* * * * *